US008788317B2

(12) United States Patent
Koyama

(10) Patent No.: US 8,788,317 B2
(45) Date of Patent: Jul. 22, 2014

(54) SOFTWARE DEVELOPMENT RESOURCE ESTIMATION SYSTEM

(75) Inventor: Shigeru Koyama, Tokyo (JP)

(73) Assignee: Jastec Co., Ltd, Tokyo (JP)

( * ) Notice: Subject to any disclaimer, the term of this patent is extended or adjusted under 35 U.S.C. 154(b) by 96 days.

(21) Appl. No.: 12/918,413

(22) PCT Filed: Feb. 20, 2008

(86) PCT No.: PCT/JP2008/052879
§ 371 (c)(1),
(2), (4) Date: Dec. 15, 2010

(87) PCT Pub. No.: WO2009/104258
PCT Pub. Date: Aug. 27, 2009

(65) Prior Publication Data
US 2011/0099051 A1    Apr. 28, 2011

(51) Int. Cl.
*G06Q 10/00* (2012.01)
(52) U.S. Cl.
USPC ............................................. 705/7.37
(58) Field of Classification Search
USPC ............................................. 705/7.37
See application file for complete search history.

(56) References Cited

U.S. PATENT DOCUMENTS

| | | | | |
|---|---|---|---|---|
| 5,860,007 | A * | 1/1999 | Soni et al. | 717/121 |
| 7,328,202 | B2 * | 2/2008 | Huang et al. | 706/52 |
| 2005/0114829 | A1 * | 5/2005 | Robin et al. | 717/101 |
| 2006/0041857 | A1 * | 2/2006 | Huang et al. | 717/104 |
| 2008/0312980 | A1 * | 12/2008 | Boulineau et al. | 705/7 |
| 2008/0313008 | A1 * | 12/2008 | Lee et al. | 705/10 |
| 2008/0313595 | A1 * | 12/2008 | Boulineau et al. | 717/101 |
| 2010/0162200 | A1 * | 6/2010 | Kamiyama et al. | 717/101 |
| 2010/0199258 | A1 * | 8/2010 | Lindley et al. | 717/105 |
| 2010/0235809 | A1 * | 9/2010 | Rath et al. | 717/105 |
| 2011/0016447 | A1 * | 1/2011 | Goel et al. | 717/101 |
| 2011/0066887 | A1 * | 3/2011 | Bassin et al. | 714/27 |
| 2011/0314449 | A1 * | 12/2011 | Babu et al. | 717/120 |

FOREIGN PATENT DOCUMENTS

| | | |
|---|---|---|
| JP | 2004-213880 | 7/2004 |
| JP | 2006-039603 A | 2/2006 |

OTHER PUBLICATIONS

Boehm et al., Software Cost Estimation with COCOMO II, 1999, IEEE Transactions on Software Engineering.*
Idri et al., Can Neural Networks be easily Interpreted in Software Cost Estimation, 2002, IEEE.*

(Continued)

*Primary Examiner* — Justin M Pats
*Assistant Examiner* — Venay Puri
(74) *Attorney, Agent, or Firm* — McGlew & Tuttle, P.C.

(57) ABSTRACT

It is possible to provide a specification modification estimation method and a specification modification estimation system which can build-in a specification modification in a development plan in advance when performing software development. The system includes: I/O unit (1) which inputs development information associated with specification modification and outputs a calculation result of a development scale obtained by the specification modification; a database (3) which accumulates a digitalized environment affect in the software development; and specification modification estimation calculation unit (2) which calculates a product amount of the entire development scale in the specification modification according to the aforementioned development information and the information accumulated in the database. Thus, it is possible to estimate a final entire development scale which fluctuates according to the specification modification at a pre-stage of a software development or during the development.

20 Claims, 3 Drawing Sheets

(56) References Cited

OTHER PUBLICATIONS

Kumar et al., Fuzzy Systems and Neural networks in Software Engineering Project Management, 1996, Information and Software Technology.*

Chulani et al., Bayesian Analysis of Empirical Software Engineering Cost Models, 1999, IEEE.*

Gray et al., A Comparison of Techniques for Developing Predictive Models of Software Metrics, 1997, Information and Software Technology.*

Madachy et al., Heuristic Risk Assessment Using Cost Factors, 1997, IEEE.*

Toshiki Mano, et al., Mitsumori no Hoho, 1st edition, JUSE Press, Ltd., Dec. 9, 1993, ISBN: 4-8171-6115-9, pp. 134-137.*

Tomo Uehara, et al., "Shiyo Henko ni Tomonau Source Code Henkoryo no Bunseki", IEICE Technical Report, Dec. 3, 1998, pp. 15-22, vol. 98, No. 439.

Mitsuhiro Takahashi, "Kinoryo Shakudo ni Motozuku Joho System no Cost Hyoka", IEICE Technical Report, Oct. 1, 1996, pp. 25-32, vol. 96, No. 283.

Stmator, Kaisetsusho, 87AR-0020-2, 2nd edition, Fujitsu Ltd., 1991, pp. 7-23.

\* cited by examiner

SOFTWARE DEVELOPMENT RESOURCE ESTIMATION SYSTEM

TECHNICAL FIELD

The present invention relates to a specification modification estimation method and a specification modification estimation system capable of estimating a modification amount of a product amount supposed to be obtained through a specification modification of an arbitrary process or all processes when developing a software product.

BACKGROUND ART

In the past, as means for developing a software product, the waterfall model, in which a development process is modeled and the progress of a work flows from the top process to the bottom process, was generally used The waterfall model is based on a premise that when an upper process such as determination of specification is settled, a lower process is initiated. However, a production period of a target product or the productivity of software such as workers involved or the like, in each process, is planed based on manhours in each process.

A productivity estimation method will not be described in detail herein, but various productivity estimation methods have recently been suggested to estimate the productivity more accurately and exactly.

According to a related art, when the productivity in software development is estimated based on the scale of a software product and a necessary time for the software development, the number of source code lines, function points, the amount of document of the software product, or the like are used as a gauge of the scale. For this instance, the amount of necessary time for the development is determined based on the total number of engineers involved, working hours of each engineer, or the like. However, since this method measures the productivity applying the uniform same value to all the engineers without taking a difference in the level of ability among individual engineers into account, it is not be said to be an accurate method of estimating the productivity.

In an actual software development, it is very frequent that work in a lower process is initiated before settlement of the specification in a higher process and there are a number of products that become useless due to frequent modifications of the specification. For such a reason, it is difficult to estimate the productivity accurately.

Thus, as in Patent Document 1, a software development account-adjustment management system is provided capable of increasing a reliability by estimating productivity as precisely as possible, establishing the plan of software development, and performing feedback of a difference between a development status and an initial plan to data serving as a base of the plan, when the difference between the development status and the initial plan occurs.

Patent Document 1: Japanese Patent Application No. 2004-213880

According to Patent Document 1, since not only predetermined information but also information obtained through actual development can be updated, it is possible to repeatedly perform production management of software development and achieve an increased accuracy of the development plan.

In appraising the software development, modifications of the specification that occur during the development and works which are not included in a software product are taken into consideration, resulting in a further increase in accuracy of the development plan.

DISCLOSURE OF THE INVENTION

Problems to be Solved by the Invention

However, although this system is advantageous in that the accuracy of the plan is high compared with the estimation of a related art, the system may not deal with the case in which many times of modifications of the specification are incorporated.

That is, when a specification modification is performed in the software development, status such as the development scale and an increase of cost have to be reestimated every time that the modification of the specification is performed, which leads to an exponential increase in the development scale.

Thus, performing the specification modification as less as possible can yield a reduction of development cost. In the method disclosed in Patent Document 1, however, the development cost changes depending on a correlation of the amount of an existing system that is a base, an additional amount, and a deletion amount. Therefore, the accuracy of the estimation may degrade whenever the specification modification is performed.

Principal objects to be obtained by the invention are as follows.

A first object of the invention is to provide a specification modification estimation method and a specification modification estimation system capable of incorporating specification modifications into a development plan before the outset of software development.

A second object of the invention is to provide a specification modification estimation method and a specification modification estimation system capable of reducing development cost by estimating a specification modification before initiation of software development.

A third object of the invention is to provide a specification modification estimation method and a specification modification estimation system capable of estimating a specification modification exactly whenever the specification modification is repeated.

Other objects of the invention are apparent from the description of the specification, drawings, and particularly claims.

Means for Solving the Problems

In order to solve the above-mentioned problems, the invention provides a method including recognizing development information on a specification modification input from a terminal of a user, calculating an initial scale, a yield, a specification modification ratio, and an entire development scale based on the development information stored in a database, and outputting and displaying calculated values onto the terminal.

Also, in order to solve the above-mentioned problems, the invention provides a system including an I/O unit for allowing input of development information on a specification modification and output of a calculated result of a development scale obtained through the specification modification, a database for allowing a quantified environmental influence rate on software development to accumulate therein, and a specification modification estimation calculation unit for calculating an amount of products over the entire development scale obtained through the specification modification based on the development information and information accumulated in the database.

Specifically, in order to solve the above-mentioned problems, the above objects of the invention can be achieved by employing novel and advantageous means according the following super ordinate and subordinate concepts described below.

According to a first aspect of the invention, there is provided a specification modification estimation method of calculating fluctuation of a development scale that is resulted from a specification modification input from a terminal of a user during software development based on development information obtained by quantifying information on the specification modification and the development information stored in a database, and estimating an entire development scale according to the modified specification. The specification modification estimation method includes a development information recognition step of recognizing the development information input from the user, an initial scale development step of calculating an original development scale as an initial scale by adding a product amount baseline included in the development information to a quantified environmental influence rate on software development requested to and received from the database, a yield calculation step of calculating a yield which is a ratio of a result obtained through the specification modification, based on the initial scale, the number of times of specification modifications, and a product amount established at the time of specification modification and included in the development information, a specification modification ratio calculation step of calculating a modification amount of the product amount, which is included in the development information is performed, when the specification modification is performed, as a specification modification ratio, an entire development scale calculation step of calculating the entire development scale obtained through the specification modification by multiplying the initial scale by the yield and the sum of specification modification ratios, and an entire development scale output step of outputting and displaying the entire development scale on the terminal of the user.

A method according to a second aspect of the invention employs the specification modification estimation method in which the entire development scale described in the method according to the first aspect of the invention is calculated by calculating a development scale $V_{ij}$ by an expression of $V_{ij} \approx V_0 \epsilon_j \times (1 + \Sigma_{i=j-i} \alpha_{ij})$ on the assumption that the yield is $\epsilon_j$ and the specification modification ratio is $\alpha_{ij}$ when the initial scale $V_0$ is subjected to the specification modification i times (where i is a natural number) and is calculated by an expression of $V \approx \Sigma_{j=1 \sim n} \{V_0 \times \epsilon_j \times (1 + \Sigma_{i=j-i} \alpha_{ij})\}$ on the assumption that the entire development scale is V when the specification modification is performed by n times in total.

A method according to a third aspect of the invention employs the specification modification estimation method in which the initial scale described in the method according to the first or second aspect of the invention is calculated by an expression of $V_0 = V_B \times (1 + \Sigma \gamma)$ based on the assumption that the product amount baseline is $V_B$ and the environmental influence rate on the software development is $\gamma$, and the initial scale is $V_0$.

A method according to a fourth aspect of the invention employs the specification modification estimation method in which the yield described in any one of the first, second, and third aspects of the method of the invention is calculated by an expression of $\epsilon_j = \{V_j/V_0\} \times 100$ on the assumption that a product amount at time j is $V_j$ when the specification modification is performed i times at the time j with the yield $\epsilon_j$.

A method according to a fifth aspect of the invention employs the specification modification estimation method in which when the specification moderation ratio is $\alpha_{ij}$, the specification modification ratio described in any one of the first, second, third and forth aspects of the method of the invention is calculated by an expression of $\alpha_{ij} = -V_{1ij} + V_{2ij} + V_{3ij}$ based on a rejection target ratio $V_{1ij}$ which is a comparative ratio of a product amount of objects to be rejected to the initial scale $V_0$ included in the development information, a rejection net ratio $V_{2ij}$ which is a comparative ratio of a rejection net amount to the initial scale $V_0$, and an addition ratio $V_{3ij}$ which is a comparative ratio of an additional amount to initial scale $V_0$.

A method according to a sixth aspect of the invention employs the specification modification estimation method in which a specification modification amount H when the yield $\Sigma \epsilon_j$ is set to 1.0 and the specification modification is performed on all the development units n times described in any one of the first, second, third, forth and fifth aspects of the method of the invention is calculated by an expression of $H = \Sigma_{j=1 \sim n} \{V_0 \times \epsilon_j \times \{(1 + \Sigma_{i=j-i} \alpha_{ij}) - \Sigma_{i=j-i} \alpha_{ij}\}\}$.

A method according to a seventh aspect of the invention employs the specification modification estimation method in which the entire development scale $V_k$ when a declination occurs in previous processes k times at an i-th specification modification described in any one of the first, second, third, forth, fifth and sixth aspects of the method of the invention is calculated by an expression of $V_k = \Sigma_{j=1 \sim n} V_{nj} = \Sigma_{j=1 \sim n} \{V_0 \times \epsilon_j \times \Sigma_{i=j-i} \alpha_{ij}\}$.

A system according to a first aspect of the invention employs the specification modification estimation system comprising: an I/O unit configured to calculate fluctuation of a development scale obtained through a specification modification during software development and for allowing inputting, transmitting, and outputting of development information obtained by quantifying information on the specification modification when an entire development scale obtained through the specification modification is estimated; a database for allowing a quantified environment influence rate to accumulate therein when performing the software development; and a specification modification estimation calculation unit configured to calculate a product amount of the entire development scale obtained through the specification modification based on a value input from the I/O unit and a value stored in the database, wherein the specification modification estimation calculation unit includes: an initial scale development unit configured to calculate an original development scale as an initial scale by adding a product amount baseline included in the development information to a quantified environmental influence rate on software development requested to and received from the database; a yield calculation unit configured to calculate a yield which is a ratio of a result obtained when the specification modification is performed, based on the initial scale, the number of times of the specification modification, and a product amount included in the development information at the specification modification; a specification modification ratio calculation unit configured to calculate a modification amount of the product amount, which is included in the development information, when performing the software development, as a specification modification ratio; and an entire development scale calculation unit configured to calculate the entire development scale obtained through the specification modification by multiplying the initial scale by the yield ratio and a sum of the specification modification ratios.

A system according to a second aspect of the invention employs the specification modification estimation system in which the entire development scale calculation unit described in the system according to the first aspect of the invention calculates an entire development scale $V_{ij}$ using an expression of $V_{ij} = V_0 \times \epsilon_j \times (1 + \Sigma_{i=j \sim i} \alpha_{ij})$ on the assumption that the yield is $\epsilon_j$ and the specification modification ratio described in first aspects of the invention of system is performed by n times in total.

A system according to a third aspect of the invention employs the specification modification estimation system in which the initial scale calculation unit described in the system according to the first or second aspect of the invention calculates the initial scale using an expression of $V_0 = V_B \times (1 + \Sigma \gamma)$ based on the product amount baseline $V_B$ and the environmental influence rate on the software development $\gamma$ on the assumption that the initial scale is $V_0$.

A system according to a fourth aspect of the invention employs the specification modification estimation system in which the yield calculation unit described in any one of the first, second, and third aspects of the system of the invention calculates the yield using an expression of $\epsilon_j = \{V_j/V_0\} \times 100$ on the assumption that a product amount at time j is $V_j$ when the specification modification is performed i times at the time j with the yield $\epsilon_j$.

A system according to a fifth aspect of the invention employs the specification modification estimation system in which the specification modification ratio described in any one of the first, second, third and fourth aspects of the system of the invention calculates the specification modification ratio using an expression of $\alpha_{ij} = -V_{1ij} + V_{2ij} + V_{3ij}$, based on a rejection target ratio $V_{1ij}$ which is a comparative ratio of a product amount of objects to be rejected to the initial scale $V_0$ included in the development information, a rejection net ratio $V_{2ij}$ which is a comparative ratio of a rejection net amount to the initial scale $V_0$, and an addition ratio $V_{3ij}$ which is a comparative ratio of an additional amount to initial scale $V_0$.

A system according to a sixth aspect of the invention employs the specification modification estimation system in which when the yield $\Sigma \epsilon_j$ is set to 1.0, the yield calculation unit described in any one of the first, second, third, fourth and fifth aspects of the system of the invention calculates a specification modification amount H when the specification modification is performed on all the development units n times is calculated by an expression of $H = \Sigma_{j=1 \sim n} \{V_0 \times \epsilon_j \times \{(1 + \Sigma_{i=j-i} \alpha_{ij}) - \Sigma_{i=j-i} \alpha_{ij})\}$.

A system according to a seventh aspect of the invention employs the specification modification estimation system in which the entire development scale calculation unit described in any one of the first, second, third, fourth, fifth and sixth aspects of the system of the invention calculates the entire development scale $V_k$, when a declination occurs in previous processes k times at an i-th specification modification, using an expression of $V_k = \Sigma_{j=1 \sim n} V_{nj} = \Sigma_{j=1 \sim n} \{V_0 \times \epsilon_j \times \Sigma_{i=j-i} \alpha_{ij}\}$.

Effects of the Invention

According to the aspects of the invention, it is possible to incorporate the estimation of the specification modification into the development plan in the case in which the specification modification occurs in a pre-state of the software development.

It is possible to estimate the entire development scale resulting from the specification modifications occurring during the software development. Moreover, even when the specification modification is repeated plural times, and it is possible to obtain an advantage that it is not necessary to modify the original development plan.

BRIEF DESCRIPTION OF LETTERS AND NUMERALS

A: SPECIFICATION MODIFICATION ESTIMATION SYSTEM
1: I/O UNIT
2: SPECIFICATION MODIFICATION ESTIMATION CALCULATION UNIT
3: DATABASE
21: INITIAL SCALE CALCULATION UNIT
22: YIELD CALCULATION UNIT
23: SPECIFICATION MODIFICATION RATIO CALCULATION UNIT
24: DEVELOPMENT SCALE CALCULATION UNIT
25: SPECIFICATION MODIFICATION AMOUNT CALCULATION UNIT
26: SPECIFICATION MODIFICATION CORRECTION UNIT
$V_O$: INITIAL DEVELOPMENT SCALE
$V_B$: PRODUCT AMOUNT BASELINE
$V_{ij}$: DEVELOPMENT SCALE
V: ENTIRE DEVELOPMENT SCALE
$\gamma$: PRODUCT AMOUNT ENVIRONMENT VARIABLE
$\epsilon_j$: YIELD
$\alpha_{ij}$: SPECIFICATION MODIFICATION RATIO
$\alpha 1$: REJECTION TARGET AMOUNT
$\alpha 2$: REJECTION NET AMOUNT
$\alpha 3$: ADDITIONAL AMOUNT
$V_{1ij}$: REJECTION TARGET RATIO
$V_{2ij}$: REJECTION NET RATIO
$V_{3ij}$: ADDITION RATIO
s1: ESSENTIAL INFORMATION
s2: OPTIONAL INFORMATION
H: SPECIFICATION MODIFICATION AMOUNT

BEST MODE FOR CARRYING OUT THE INVENTION

Hereinafter, a system according to an exemplary embodiment will be described with reference to the accompanying drawings.

(Exemplary System)

Figure 1:
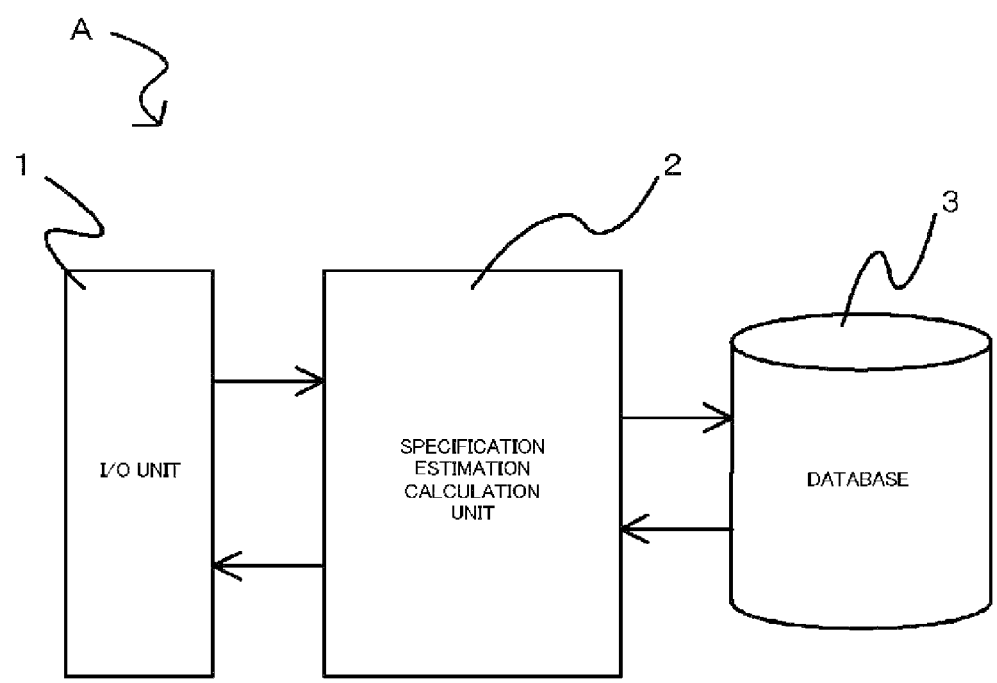
FIG. 1 is a diagram illustrating the functional configuration of a specification modification estimation system related to an exemplary system according to the invention.

FIG. 1 is a diagram illustrating the functional configuration of the specification modification estimation system corresponding to the exemplary system.

As shown in the drawing, a specification modification estimation system A corresponding to the exemplary system includes an I/O unit 1 for allowing inputting and outputting of required information when a user of the system estimates a specification modification, a specification modification estimation calculation unit 2 for calculating a numeral value of a change of a development scale (product amount) caused by the specification modification based on the information received from an input unit, and an environment database 3 in which information on environment of software development that is used in the specification modification estimation calculation unit 2 for the specification estimation used is accumulated.

The I/O unit 1, the specification modification estimation calculation unit 2, and the environment database 3 may be incorporated in a terminal such as a personal computer. However, the I/O unit 1 and the specification modification estimation calculation unit 2 or the environment database 3 may be mounted in different terminals and may be connected so as to communicate with each other via an Internet line, a dedicated line, or the like.

The I/O unit 1, which is a constituent element of the system according to the invention, has a function of transmitting estimation details input by the user to the specification modification estimation calculation unit 2, when performing calculation for specification estimation. In addition, the I/O unit 1 includes a data input portion (not shown) and a display portion displaying a calculation result calculated by the specification modification estimation calculation unit 2. The I/O unit 1 is realized by a terminal apparatus such as a personal computer or a PDA as long as it satisfies all the above conditions.

The specification modification estimation calculation unit 2 is a functional unit that receives the information transmitted from the I/O unit 1 and calculates an amount of products (a product amount) that may be obtained through the specification modification, based on the data. The specification modification estimation calculation unit 2 is realized by a system having a calculation function in each functional unit of the specification modification estimation calculation unit 2 described below.

The environment database 3 is a database in which, as data, definitions of variables used in the specification modification estimation calculation unit 2 is accumulated, and which is a functional unit which transmits a value to the specification modification estimation calculation unit 2 under the request from the specification modification estimation calculation unit 2.

Figure 2:
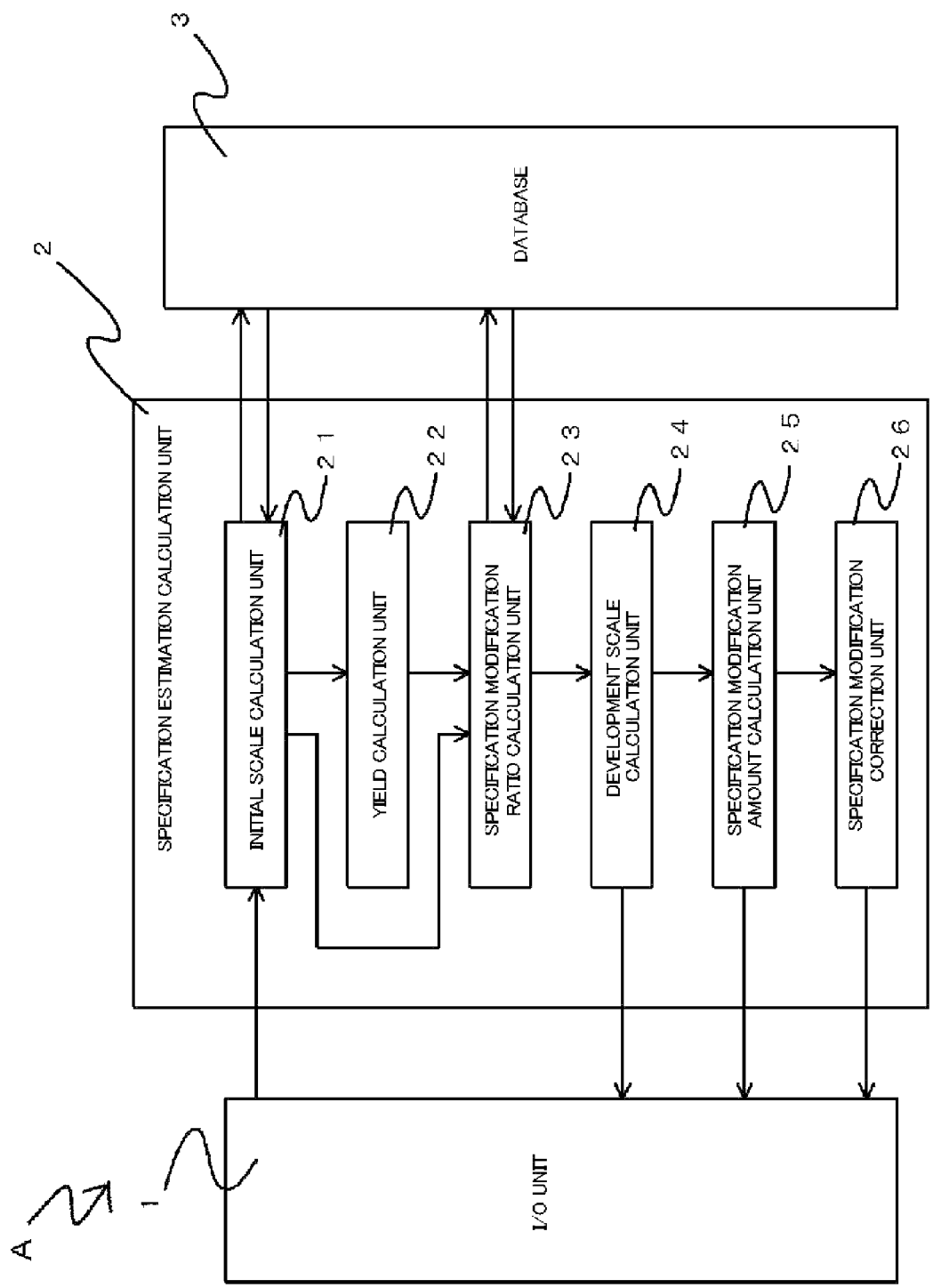
FIG. 2 is a diagram illustrating the functional configuration of a specification modification estimation calculation unit 2 related to the exemplary system according to the invention.

Next, detailed functional units in the specification modification estimation calculation unit 2 of the system according to the invention will be described in detail with reference to FIG. 2. Hereinafter, the overview of each respective functional unit of the specification modification estimation calculation unit 2 will be descried. Since the specification modification estimation calculation unit 2 performs calculation based on numerical values of various development environmental factors, the configuration of each respective unit of the specification modification estimation calculation unit 2 will be first described, and then the concepts of each respective functional unit, variables to be used, and the functional details will be described in detail.

As shown in the drawing, the specification modification estimation calculation unit 2 of the specification estimation system A includes an initial scale calculation unit 21 for receiving the information transmitted from the I/O unit 1 and calculating an initial scale of the software development based on the received data, a yield calculation unit 22 and specification modification ratio calculation unit 23 for calculating a yield and a specification modification ratio, respectively of each software based on the value of the initial scale received from the initial scale calculation unit 21, development scale calculation unit 24 for calculating a development scale obtained through the specification modification based on the values transmitted from the initial scale calculation unit 21, the yield calculation unit 22, and the specification modification ratio calculation unit 23, a specification modification amount calculation unit 25 for calculating a product amount obtained through the specification modification based on the value calculated by the development scale calculation unit 24, and a specification modification correction unit 26 for calculating a development scale obtained by adjusting and correcting a declination of the specification modification process for the value calculated by the development scale calculation unit 24.

Hereinafter, the functions of the respective calculation unit, the definitions of the variables to be used, expressions used by the calculation unit will be described.

(Initial Scale Calculation Unit)

First, the initial scale calculation unit 21 will be described. The initial scale calculation unit 21 is a calculation unit that calculates an initial scale $V_O$ which is a process product amount (development scale) when there is no specification modification. The initial scale $V_O$ is calculated by Expression 1.

[Expression 1]

$$V_O = V_B \times (1 + \Sigma \gamma) \quad (1)$$

In this expression, $V_B$ denotes a product amount baseline. The product amount baseline refers to a standard development scale of general software development.

$\gamma$ denotes a product amount environment variable, and an influence rate can be set for each characteristic of 21 items, based on a development request for each characteristic.

The characteristics of the product amount environment variables $\gamma$ are shown in Table 1, and the influence rates need to be set in advance by terms of percentage. Data for the set influence rates may be stored in the database 3, as shown in FIG. 1, and the initial scale calculation unit 21 may read the set values of the data from the database 3 via a communication line such as the Internet or the dedicated line. Alternatively, even though not shown here, an influence rate database or the like may be stored in the initial scale calculation unit 21.

TABLE 1

| | |
|---|---|
| Functionality | Finality, Correctness, Connectivity, Conformity, Security |
| Reliability | Maturity, Problem Tolerance, Recovery |
| Usability | Understandability, Acquirement, Operability |
| Efficiency | Execution Efficiency, Resource Efficiency |
| Conservation | Interpretation, Modification Workability, Experiment |
| Transplantation | Environment Applicability, Transplantation Workability, Scale Conformity, Substitution |

(Yield Calculation Unit)

Next, the yield calculation unit 22 will be described. A yield $\epsilon_j$ denotes an index value representing timing of the specification modification. The yield calculation unit 22 calculates the yield $\epsilon_j$ using the ratio of the product amount $V_j$ at the time of a phase of development to the initial scale $V_O$ transmitted from the initial scale calculation unit 21 and is expressed by Expression 2.

[Expression 2]

$$\epsilon_i(\%) = \{V_i/V_o\} \times 100 \quad (2)$$

(Specification Modification Ratio Calculation Unit)

The specification modification ratio calculation unit 23 calculates a specification modification ratio $\alpha_{ij}$ which is a ratio of the specification modification, which is an addition request or a deletion request for requiring addition to or deletion from the initial development request, to the initial scale $V_0$. Here, i denotes the number of times of specification modifications expressed in writing for each specification modification.

The specification modification ratio calculation unit 23 calculates a rejection target ratio expressed by Expression 3 which is a comparative ratio between an amount α1 of rejection objects in rejection schedule and the initial scale $V_0$, a rejection net ratio $V_{2ij}$ expressed by Expression 4 which is a comparative ratio between a rejection net amount α2 that is the amount of rejected products among the finished products and the initial scale $V_0$, and an addition ratio $V_{3ij}$ expressed by Expression 5 which is a comparative ratio between an additional amount α3 that is an amount to be added to the product amount due to the specification modification and the initial scale $V_0$. Additionally, the specification modification ratio calculation unit 23 calculates a specification modification ratio $\alpha_{ij}$ by adding and/or subtracting these ratios as shown in Expression 6.

[Expression 3]

$$V_{1ij} = \{\alpha_1/V_o\} \times 100 \tag{3}$$

[Expression 4]

$$V_{2ij} = \{\alpha_2/V_o\} \times 100 \tag{4}$$

[Expression 5]

$$V_{3ij} = \{\alpha_3/V_o\} \times 100 \tag{5}$$

[Expression 6]

$$\alpha_{ij} = -V_{1ij} + V_{2ij} + V_{3ij} \tag{6}$$

(Development Scale Calculation Unit)

The development scale calculation unit 24 calculates a development scale $V_{ij}$ that is a result obtained through i times of the specification modifications on the development unit j as expressed by Expression 7, based on the values calculated by the initial scale calculation unit 21, the yield calculation unit 22, and the specification modification ratio calculation unit 23.

[Expression 7]

$$V_{ij} \approx V_o \times \epsilon_i \times (1 + \Sigma_{i=j-i} \alpha_{ij}) \tag{7}$$

The development scale calculation unit 24 calculates the entire development scale V that is a result obtained through the specification modifications performed on all of the development units n times (where n is a natural number) using Expression 8.

[Expression 8]

$$V = \sum_{j=1\sim n} V_{ni} \tag{8}$$

$$= \sum_{j=1\sim n} \left\{ V_O \times \varepsilon_i \times \left(1 + \sum_{j=1\sim i} \alpha_{ij}\right) \right\}$$

The I/O unit 1 can be input with the yields $\epsilon_j$ in advance and can calculate the entire development scale V, for example, as in Expression 10, when the sum of the yields $\epsilon_j$ is set to 1.0 in advance, as in Expression 9.

[Expression 9]

$$\Sigma_{i=1\sim n} \epsilon_i = 1.0 \tag{9}$$

[Expression 10]

$$V = V_o + \Sigma_{j=1\sim n} \{V_o \times \epsilon_j \times \Sigma_{i=i\sim n} \alpha_{ij}\} \tag{10}$$

(Specification Modification Amount Calculation Unit)

The specification modification amount calculation unit 25 receives the entire development scale V calculated by the development scale calculation unit 24 and calculates a specification modification amount H which is an amount of a change of the product amount generated through the specification modifications. Expression 11 is a calculation expression of the specification modification amount H calculated based on the result obtained by Expression 10.

[Expression 11]

$$H = \Sigma_{i=1\sim n} \{V_o \times \epsilon_j \times \Sigma_{i=j\sim n} \alpha_{ij}\} \tag{11}$$

(Specification Modification Correction Unit)

The specification modification correction unit 26 is a calculation unit which corrects the specification modification amount when there is a declination with a number of higher processes corresponding to k times at the time of an i-th specification modification. As expressed in Expression 12, the specification modification correction unit 26 receives the entire development scale V calculated by the development scale calculation unit 24 and the rejection net ratio $V_{2ij}$ calculated by the specification modification ratio calculation unit 22, and calculates the entire development scale V where the process declination is corrected by subtracting the received values.

[Expression 12]

$$V_k = \sum_{j=1\sim n} V_{ij} \tag{12}$$

$$= \sum_{j=1\sim n} \left\{ V_0 \times \varepsilon_j \times \left\{ \left(1 + \sum_{i=j\sim i} \alpha_{ij}\right) - \sum_{i=j\sim n-V_{2ij}} \right\} \right\}$$

The detailed configurations of the respective calculation units of the specification modification estimation calculation unit 2 have hitherto been described.

Embodiment

Figure 3:
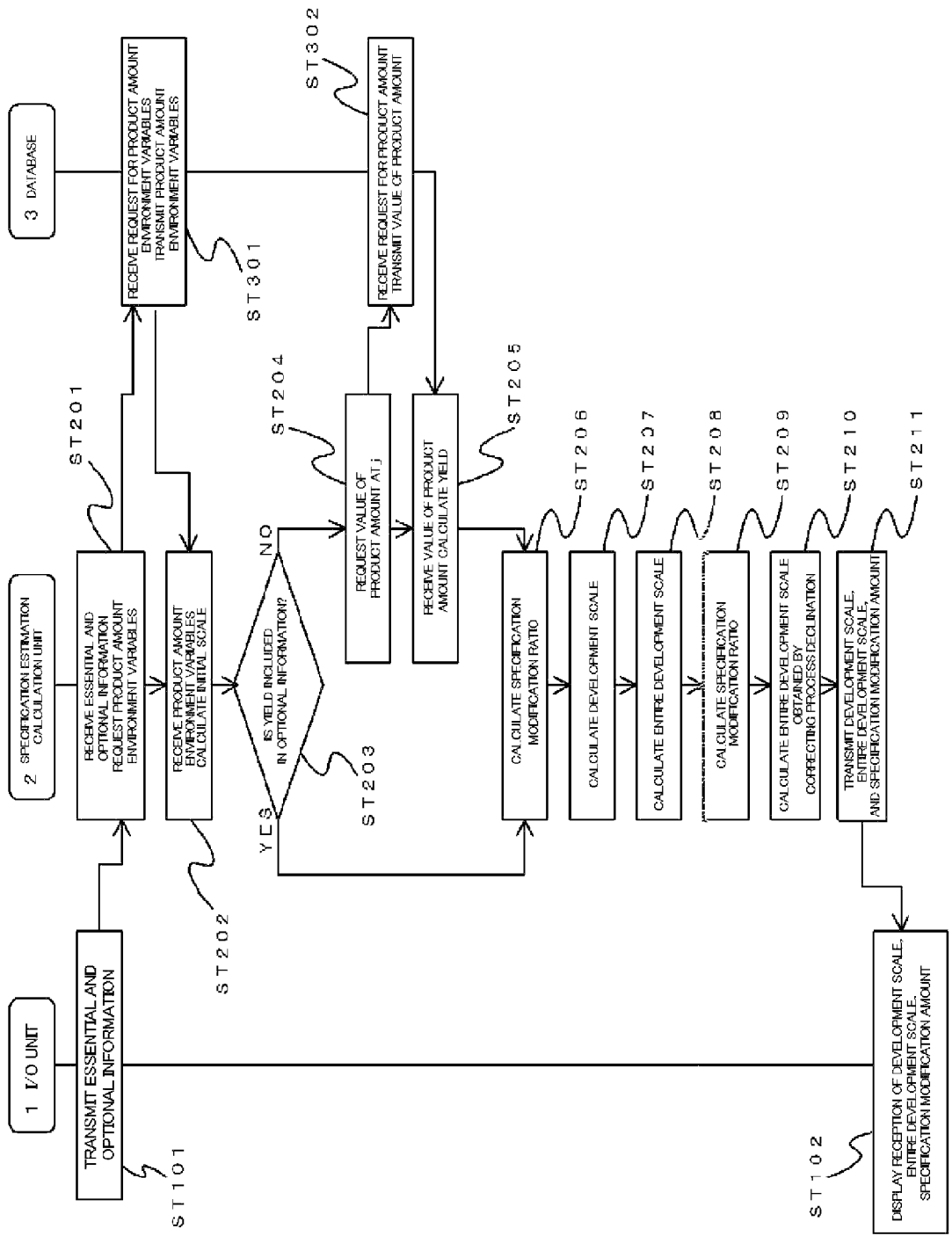
FIG. 3 is a flowchart illustrating a sequence according to an embodiment of the invention.

Next, an embodiment of the invention in which the above-described system is used will be described with reference to the diagram illustrating the configuration of the system in FIG. 2 and a flowchart in FIG. 3.

First, when a user inputs, as the development information which is quantified information on the specification modification, essential information s1 including development units j, the number (i) of times of specification modifications, and a product amount production baseline $V_B$ and optional information s2 that is optionally input and includes the yield $\epsilon_j$, the rejection target amount α1, the rejection net amount α2, and the additional amount α3, using the input unit such as a keyboard (not shown) of the I/O unit 1, these values are transmitted from the I/O unit 1 to the initial scale calculation unit 21 of the specification modification estimation calculation unit 2 (ST 101).

When the essential information s1 and the essential information s2 are received from the I/O unit 1, the initial scale calculation unit 21 requests the database 3 to transmit the product amount environment variables γ (ST 201).

The database 3 transmits the product amount environment variables γ stored in the database to the initial scale calculation unit 21 in response to the request from the initial scale calculation unit (ST 301).

The initial scale calculation unit 21 calculates the initial scale $V_0$ using Expression 1 based on the essential information s1 and the product amount environment variables γ received from the database 3, and transmits the essential information s1 and the optional information s2 transmitted from the I/O unit 1 and the initial scale $V_0$ to the yield calculation unit 22 and the specification modification ratio calculation unit 23 (ST 202).

When the yield $\epsilon_j$ of the optional information s2 is transmitted from the I/O unit 1 (ST 203), the initial scale calculation unit 21 directly transmits the initial scale $V_0$, the essential information s1, and the optional information s2 to the development scale calculation unit 24, and transmits the rejection target amount α1, the rejection net amount α2, and the additional amount α3 included in the optional information s2 received from the I/O unit 1, in addition to the initial scale $V_0$, to the specification modification ratio calculation unit 23.

On the other hand, when the yield $\epsilon_j$ is not included in the optional information S2 (ST 203), the initial scale calculation unit 21 transmits the development unit j included in the essential information s1 and the initial scale $V_0$ to the yield calculation unit 22, and transmits the essential information s1 and the initial scale $V_0$ to the development scale calculation unit 24.

Next, the yield calculation unit 22 requests the database 3 to transmit the product amount $V_j$ at the time j using the development unit j (ST 204). The requested database 3 transmits the product amount $V_j$ at the time j to the yield calculation unit 22 (ST 302).

When the product $V_j$ is received, the yield calculation unit 22 calculates the yield $\epsilon_j$ using Expression 2 and transmits the calculated value to the development scale calculation unit 24 (ST 205).

Next, the specification modification ratio calculation unit 23 calculates the rejection target ratio $V_{1ij}$, the rejection net ratio $V_{2ij}$, and the addition ratio $V_{3ij}$ using Expressions 3 to 5 based on the initial scale $V_0$, the rejection target amount α1, the rejection net amount α2, and the additional amount α3 received from the initial scale calculation unit 21. The specification modification ratio calculation unit 23 calculates the specification modification ratio $\alpha_{ij}$ using Expression 6 based on the rejection target ratio $V_{1ij}$, the rejection net ratio $V_{2ij}$, and the addition ratio $V_{3ij}$ and transmits the calculated values to the development scale calculation unit 24 (ST 206).

The development scale calculation unit 24 calculates the development scale $V_{ij}$ which is a result obtained through i times of the specification modifications on the development unit j based on the essential information s1, the initial scale $V_0$, the yield $\epsilon_j$, and the specification modification ratio $\alpha_{ij}$ transmitted from the initial development calculation unit 21 and the yield calculation unit 22, and the specification modification ratio calculation unit 23 using expression 7 (ST 207).

The development scale calculation unit 24 calculates the entire development scale V which is a result obtained by performing n times of specification modifications (where n is a natural number) with respect to all of the development units, based on the development scale $V_{ij}$, using Expression 8, and delivers the resultant entire development scale V to the specification modification amount calculation unit 25 (ST 208).

The specification modification amount calculation unit 25 calculates the specification modification amount H using Expression 11, based on the entire development scale V received from the development scale calculation unit 24 (ST 209).

Here, when the declination occurs in k processes (where k is a natural number) at the i-th specification modification, the number k, which is the number of processes in which process declination has occurred, is input into the I/O unit 1; the number k (the number of times of occurrence of the process declination) and the rejection net ratio $V_{2ij}$ in each process are delivered sequentially in the order from the initial scale development scale calculation unit 21 to the development scale calculation unit 24; the development scale calculation unit 24 transmits the entire development scale V and the number k relating to the process declination to the specification modification correction unit 26; and the specification modification correction unit 26 calculates a corrected entire development scale $V_k$ obtained by correcting the process declination using Expression 12 (ST 210).

In the above description, the entire development scale V obtained through the specification modifications performed n times for all of the development units j is calculated but the invention is not limited thereto. For example, when the specification modification is performed n times evenly in the process of arbitrary development units j, the I/O unit 1 inputs and sets both the yield $\epsilon_j$ obtained through the specification modification and the specification modification ratio $\alpha_{ij}$ to given values. For example, the yield $\epsilon_j=1/n$ and the specification modification ratio $\alpha_{ij}=\alpha$ are set, a specification modification amount Ha is calculated by Expression 13, using the set values set in Expression 12.

[Expression 13]

$$H_a = V_o \times \alpha \times (n+1)/2 \tag{13}$$

After the above-described calculation process ends, the development scale calculation unit 24 transmits the development scale $V_{ij}$ and the entire development scale V to the I/O unit 1, the specification modification amount calculation unit 25 transmits the specification modification amount H to the I/O unit 1, and the specification modification correction unit 26 transmits the entire development scale $V_k$ obtained by correcting the process declination to the I/O unit 1 (ST 211).

The I/O unit 1 which has received the values from the respective calculation units of the calculation unit 2 displays the calculated results on a display apparatus such as a monitor included in the I/O unit 1 so that the user can check the estimated product amount through the specification modification in the form of specific numeral values (ST 102).

Even though the embodiment of the invention has hitherto been described according to an example of the specification modification estimation system, the invention is not necessarily limited to the above-described means. The invention is modified appropriately within the scope of the above-described advantages.

The invention claimed is:

1. A software development and resource estimation method of deriving a change in product amount when a number of times of specification modifications occur during software development to estimate a development scale, the software development and resource estimation method comprising:

using a software development and resource estimation system comprising an I/O unit configured to recognize, transmit, and output development information, which is information on a specification modification input through a terminal by a user during the software modification, a database configured to accumulate environmental information on the software development on which the specification modification is performed, and a computer including a specification modification estimation calculation unit configured to calculate the estimation of a development scale in the specification modification using the information input from the I/O unit and the information stored in the database and to transmit the calculated estimation to the I/O unit, wherein the specification modification estimation calculation unit sequentially executes the following steps:

an initial scale calculation step of requesting and obtaining an influence rate representing a degree of influence on a software development environment by each quality characteristic of software set and stored in the database when the development information is received from the I/O unit, and calculating a development scale before the specification modification as an initial development scale by multiplying a product amount baseline representing a standard development scale of the software included in the development information by a value obtained by adding 1 to a total sum of influence rates;

a yield calculation step of requesting and obtaining a product amount from the database at a time of generating a development unit when a modification target development unit included in the initial development scale of the initial scale calculation step and the development information are received, and calculating a yield which is a ratio of the initial development scale to the product amount;

a specification modification ratio calculation step of receiving a rejection amount of a product or an additional amount of a product, which are included in the development information, and the initial development scale from the initial development scale calculation step when the product is rejected or added due to the specification modification, and calculating a specification modification ratio, which is a ratio of the rejection amount of the product or the additional amount of the product to the initial development scale;

an entire development scale calculation step of receiving the initial development scale, the yield, and the specification modification ratio from the initial scale calculation step, the yield calculation step, and the specification modification ratio calculation step, respectively, deriving a resultant development scale which is obtained by adding 1 to a total sum of the specification modification ratios to a specification modification of each development unit obtained by multiplying the initial development scale by the yield, and calculating an entire development scale caused by a plurality of specification modifications by totaling the development scales of all development units;

a specification modification amount calculation step of calculating a specification modification amount which is a modification amount of the product amount due to the specification modification based on the entire development scale calculation step received in the entire development scale calculation step;

a specification modification correction step of receiving a rejection net ratio, calculated by the specification modification ratio calculation step, which is a comparative ratio between the rejection amount of a product and the initial scale, and the entire development scale from the entire development scale calculation step when the specification modification causes declination in the number of the specification modification between processes in respect to the specification modification amount, correcting the specification modification ratio by subtracting the received rejection net ratio, and calculating a corrected entire development scale; and an entire development scale output step of outputting and displaying the development scale and the entire development scale transmitted in the entire development scale calculation step, the specification modification amount transmitted in the specification modification amount calculation step, and the corrected entire development scale transmitted in the specification modification correction step on the terminal of the user.

2. The software development and resource estimation method according to claim 1, wherein the development scale is calculated by an expression of $V_{ij} \approx V_0 \times \epsilon_j \times (1+\Sigma_{i=j-i}\alpha_{ij})$ on the assumption that the initial scale is $V_0$, the yield is $\epsilon_j$, and the specification modification ratio is $\alpha_{ij}$ when the initial scale is subjected to the specification modification i times (where i is a natural number) and is calculated by an expression of $V \approx \Sigma_{j=1 \sim n}\{V_0 \times \epsilon_j \times (1+\Sigma_{i=j-i}\alpha_{ij})\}$ on the assumption that the entire development scale is V when the specification modification is performed by n times in total.

3. The software development and resource estimation method according to claim 1, wherein the initial scale is calculated by an expression of $V_0 = V_B \times (1+\Sigma\gamma)$ on the assumption that the initial scale is $V_0$, the product amount baseline is $V_B$, and the environmental influence rate of the software development is $\gamma$.

4. The software development and resource estimation method according to claim 1, wherein the yield is calculated by an expression of $\epsilon_j = \{V_j/V_0\} \times 100$ on the assumption that the yield is $\epsilon_j$, the initial scale is $V_0$, and a product amount at an initial value of a development unit j (where j is a natural number) included in the development information is $V_j$.

5. The software development and resource estimation method according to claim 1, wherein the specification modification ratio is calculated by an expression of $\alpha_{ij} = -V_{1ij} + V_{2ij} + V_{3ij}$ on the assumption that the specification moderation ratio is $\alpha_{ij}$, the initial development scale is $V_0$, a rejection target ratio that is a ratio of a product amount of objects to be rejected to the initial scale $V_0$ and is included in the environment information is $V_{1ij}$, a rejection net ratio of a rejection net amount to the initial scale $V_0$ is $V_{2ij}$, and an addition ratio of an additional amount to the initial scale $V_0$ is $V_{3ij}$.

6. The software development and resource estimation method according to claim 1, wherein the specification modification ratio is calculated by an expression of $H=\Sigma_{j=1 \sim n}\{V_0 \times \epsilon_j \times \Sigma_{i=j-i}\alpha_{ij}\}$ on the assumption that the initial scale is $V_0$, the yield is $\epsilon_j$, the specification modification ratio is $\alpha_{ij}$, and a specification modification ratio obtained through the specification modification on all of the development units n times is H.

7. The software development and resource estimation method according to claim 1, wherein the entire development scale is calculated by an expression of $V_k = \Sigma_{j=1 \sim n}V_{nj} = \Sigma_{j=1 \sim n}\{V_0 \times \epsilon_j \times \{(1+\Sigma_{i=j-i}\alpha_{ij}) - \Sigma_{j=1 \sim n-k}V_{2ij}\}\}$ on the assumption that the initial scale is $V_0$, the yield is $\epsilon_j$, the specification modification ratio is $\alpha_{ij}$, an addition ratio of an additional amount to the initial scale $V_0$ is $V_{3ij}$, and the entire development scale when a declination occurs in previous processes k times (where k is a natural number) at an i-th specification modification is $V_k$.

8. A software development and resource estimation system of deriving a change in product amount when a number of times of specification modifications occur during software development to estimate a development scale, the system comprising:

an I/O unit configured to recognize, transmit, and output development information, which is information on a specification modification input through a terminal by a user during the software modification, a database configured to accumulate environmental information on the software development on which the specification modification is performed, and a computer including a specification modification estimation calculation unit configured to calculate estimation of a development scale in the specification modification using the information input from the I/O unit and the information stored in the database and to transmit the calculated estimation to the I/O unit;

wherein the specification modification estimation calculation unit includes:

an initial development scale calculation unit requesting and obtaining an influence rate representing a degree of influence on a software development environment by each quality characteristic of software set and stored in the database when the development information is received from the I/O unit, and calculating a development scale before the specification modification as an initial development scale by multiplying a product amount baseline representing a standard development scale of the software included in the development information by a value obtained by adding 1 to a total sum of the influence rates;

a yield calculation unit requesting and obtaining a product amount from the database at the time of generating a development unit when a modification target development unit included in the initial development scale of the initial scale calculation unit and the development information are received, and calculating a yield which is a ratio of the initial development scale to the product amount;

a specification modification ratio calculation unit receiving a rejection amount of a product or an additional amount of a product, which are included in the development information, and the initial development scale from the initial development scale calculation unit when the product is rejected or added due to the specification modification, and calculating a specification modification ratio, which is a ratio of the rejection amount of the product or the additional amount of the product to the initial development scale;

an entire development scale calculation unit receiving the initial development scale, the yield, and the specification modification ratio from the initial scale calculation unit, the yield calculation unit, and the specification modification ratio calculation unit, respectively, deriving a resultant development scale which is obtained by adding a value obtained by adding 1 to a total sum of the specification modification ratios to a specification modification of each development unit obtained by multiplying the initial development scale by the yield, and calculating an entire development scale caused by a plurality of specification modifications by totaling the development scales of all development units;

a specification modification amount calculation unit calculating a specification modification amount which is a modification amount of the product due to the specification modification based on the entire development scale received in the entire development scale calculation unit; and a specification modification correction unit receiving a rejection net ratio, calculated by the specification modification ratio calculation unit, which is a comparative ratio between the rejection amount of a product and the initial scale, and the entire development scale from the entire development scale calculation unit when the specification modification causes declination in the number of the specification modification between processes in respect to the specification modification amount, correcting the specification modification ratio by subtracting the received rejection net ratio, and calculating a corrected entire development scale, wherein the I/O unit outputs and displays the development scale and the entire development scale transmitted in the entire development scale calculation unit, the specification modification amount transmitted in the specification modification amount calculation unit, and the corrected entire development scale transmitted in the specification modification correction unit on the terminal of the user.

9. The software development and resource estimation system according to claim 8, wherein the entire development scale calculation unit calculates the development scale using an expression of $V_{ij} \approx V_0 \times \epsilon_j \times (1+\Sigma_{i=j\sim i}\alpha_{ij})$ on the assumption that the initial scale is $V_0$, the yield is $\epsilon_j$, and the specification modification ratio is $\alpha_{ij}$ when the initial scale is subjected to the specification modification i times (where i is a natural number) and using an expression of $V \approx \Sigma_{j=1\sim n}\{V_0 \times \epsilon_j \times (1+\Sigma_{i=j\sim i}\alpha_{ij})\}$ on the assumption that the entire development scale is V when the specification modification is performed n times in total.

10. The software development and resource estimation system according to claim 8, wherein the initial scale calculation unit calculates the initial scale using an expression of $V_0=V_B \times (1+\Sigma\gamma)$ on the assumption that the initial scale is $V_0$, the product amount baseline is $V_B$, and the environmental influence rate of the software development is $\gamma$.

11. The software development and resource estimation system according to claim 8, wherein the yield calculation unit calculates the yield using an expression of $\epsilon_j=\{V_j/V_0\} \times 100$ on the assumption that the yield is $\epsilon_j$, the initial scale is $V_0$, and a product amount at an initial value of a development unit j (where j is a natural number) included in the development information is $V_j$.

12. The software development and resource estimation system according to claim 8, wherein the specification modification ratio calculation unit calculates the specification modification ratio using an expression of $\alpha_{ij}=-V_{1ij}+V_{2ij}+V_{3ij}$ on the assumption that the specification moderation ratio is $\alpha_{ij}$, the initial development scale is $V_0$, a rejection target ratio that is a ratio of a product amount of objects to be rejected to the initial scale $V_0$ included in the environment information is $V_{1ij}$, a rejection net ratio of a rejection net amount to the initial scale $V_0$ is $V_{2ij}$, and an addition ratio of an additional amount to the initial scale $V_0$ is $V_{3ij}$.

13. The software development and resource estimation system according to claim 8, wherein the specification modification amount is calculated by an expression of $H=\Sigma_{j=1\sim n}\{V_0 \times \epsilon_j \times \Sigma_{i=j\sim i}\alpha_{ij}\}$ on the assumption that the initial scale is $V_0$, the yield is $\epsilon_j$, the specification modification ratio is $\alpha_{ij}$, and a specification modification ratio obtained through the specification modification on all of the development units n times is H.

14. The software development and resource estimation system according to claim 8, wherein the entire development scale is calculated by an expression of $V_k=\Sigma_{j=1\sim n}V_{nj}=\Sigma_{j=1\sim n}\{V_0 \times \epsilon_j \times \{(1+\Sigma_{i=j\sim i}\alpha_{ij})-\Sigma_{j=1\sim n\sim k}V_{2ij}\}$ on the assumption that the initial scale is $V_0$, the yield is $\epsilon_j$, the specification modification ratio is $\alpha_{ij}$, an addition ratio of an additional amount to the initial scale $V_0$ is $V_{3ij}$, and the entire development scale when a declination occurs in previous processes k times (where k is a natural number) at an i-th specification modification is $V_k$.

15. A software development and resource estimation method of deriving a change in product amount when a number of times of specification modifications occur during software development to estimate a development scale, the software development and resource estimation method comprising:

provide a I/O unit;

providing a terminal;

providing information on a specification modification during software modification via said terminal;

providing a database comprising environmental information on software development on which the specification modification is performed;

providing a computer comprising a specification modification estimation calculation unit configured to calculate the estimation of a development scale in the specification modification using the information input from the I/O unit and the information stored in the database and to transmit the calculated estimation to the I/O unit, wherein the specification modification estimation calculation unit sequentially executes the following steps:

calculating an initial scale based on an influence rate representing a degree of influence on a software development environment by each quality characteristic of software set and stored in the database when the development information is received from the I/O unit, and calculating a development scale before the specification modification as an initial development scale by multiplying a product amount baseline representing a standard development scale of the software included in the development information by a value obtained by adding 1 to a total sum of influence rates;

calculating a yield based on a product amount from the database at a time of generating a development unit when a modification target development unit included in the initial development scale of the initial scale calculation step and the development information are received, said yield being a ratio of the initial development scale to the product amount;

calculating a specification modification ratio based on a rejection amount of a product or an additional amount of a product, which are included in the development information, and the initial development scale from the initial development scale calculation step when the product is rejected or added due to the specification modification, said specification modification ratio being a ratio of the rejection amount of the product or the additional amount of the product to the initial development scale;

deriving a resultant development scale based on the initial development scale, the yield and the specification modification by adding 1 to a total sum of the specification modification ratios to a specification modification of each development unit obtained by multiplying the initial development scale by the yield, and calculating an entire development scale caused by a plurality of specification modifications by totaling the development scales of all development units;

calculating a specification modification amount, said specification modification amount corresponding to a modification amount of the product amount due to the specification modification based on the entire development scale;

receiving a rejection net ratio, which corresponds to a comparative ratio between the rejection amount of a product and the initial scale, and the entire development scale when the specification modification causes declination in the number of the specification modification between processes in respect to the specification modification amount and correcting the specification modification ratio by subtracting the received rejection net ratio and calculating a corrected entire development scale; and displaying the development scale and the entire development scale, the specification modification amount and the corrected entire development scale on the terminal of the user.

16. The software development and resource estimation method according to claim 15, wherein the development scale is calculated by an expression of $V_{ij} \approx V_0 \times \epsilon_j \times (1+\Sigma_{i=j\sim i}\alpha_{ij})$ on the assumption that the initial scale is $V_0$, the yield is $\epsilon_j$, and the specification modification ratio is $\alpha_{ij}$ when the initial scale is subjected to the specification modification i times (where i is a natural number) and is calculated by an expression of $V \approx \Sigma_{j=1\sim n}\{V_0 \times \epsilon_j \times (1+\Sigma_{i=j\sim i}\alpha_{ij})\}$ on the assumption that the entire development scale is $V$ when the specification modification is performed by n times in total.

17. The software development and resource estimation method according to claim 15, wherein the initial scale is calculated by an expression of $V_0 = V_B \times (1+\Sigma\gamma)$ on the assumption that the initial scale is $V_0$, the product amount baseline is $V_B$, and the environmental influence rate of the software development is $\gamma$.

18. The software development and resource estimation method according to claim 15, wherein the yield is calculated by an expression of $\epsilon_j = \{V_j/V_0\} \times 100$ on the assumption that the yield is $\epsilon_j$, the initial scale is $V_0$, and a product amount at an initial value of a development unit j (where j is a natural number) included in the development information is $V_j$.

19. The software development and resource estimation method according to claim 15, wherein the specification modification ratio is calculated by an expression of $\alpha_{ij} = -V_{1ij}+V_{2ij}+V_{3ij}$ on the assumption that the specification moderation ratio is $\alpha_{ij}$, the initial development scale is $V_0$, a rejection target ratio that is a ratio of a product amount of objects to be rejected to the initial scale $V_0$ and is included in the environment information is $V_{1ij}$, a rejection net ratio of a rejection net amount to the initial scale $V_0$ is $V_{2ij}$, and an addition ratio of an additional amount to the initial scale $V_0$ is $V_{3ij}$.

20. The software development and resource estimation method according to claim 15, wherein the specification modification ratio is calculated by an expression of $H = \Sigma_{j=1\sim n}\{V_0 \times \epsilon_j \times \Sigma_{i=j\sim i}\alpha_{ij})$ on the assumption that the initial scale is $V_0$, the yield is $\epsilon_j$, the specification modification ratio is $\alpha_{ij}$, and a specification modification ratio obtained through the specification modification on all of the development units n times is H.

* * * * *